(12) United States Patent
Yamashita et al.

(10) Patent No.: US 8,841,805 B2
(45) Date of Patent: Sep. 23, 2014

(54) MOTOR AND MOTOR FOR ELECTRIC POWER STEERING

(75) Inventors: Yuuji Yamashita, Toyohashi (JP); Noriyuki Suzuki, Kosai (JP); Yasuyoshi Toda, Toyohashi (JP); Hiroyuki Kawata, Chiryu (JP)

(73) Assignees: Asmo Co., Ltd., Shizuoka-ken (JP); Denso Corporation, Aichi-ken (JP)

( * ) Notice: Subject to any disclaimer, the term of this patent is extended or adjusted under 35 U.S.C. 154(b) by 190 days.

(21) Appl. No.: 13/408,542

(22) Filed: Feb. 29, 2012

(65) Prior Publication Data

US 2012/0223623 A1 Sep. 6, 2012

(30) Foreign Application Priority Data

Mar. 4, 2011 (JP) ................................. 2011-048023

(51) Int. Cl.
*H02K 11/00* (2006.01)

(52) U.S. Cl.
USPC ........................................... 310/71; 310/68 B

(58) Field of Classification Search
USPC .................................................. 310/71, 68 B
See application file for complete search history.

(56) References Cited

U.S. PATENT DOCUMENTS

| 4,724,346 | A | * | 2/1988 | Klein et al. .................. 310/67 R |
| 5,864,192 | A | * | 1/1999 | Nagate et al. ............ 310/156.05 |
| 6,707,185 | B2 | * | 3/2004 | Akutsu et al. .................... 310/71 |
| 2009/0250287 | A1 | | 10/2009 | Takashima et al. |
| 2009/0251018 | A1 | | 10/2009 | Koshida |
| 2012/0223624 | A1 | | 9/2012 | Yamashita et al. |

FOREIGN PATENT DOCUMENTS

| JP | 5772188 A | 5/1982 |
| JP | 07029079 A | 1/1995 |
| JP | 10302882 A | 11/1998 |
| JP | 2000020112 A | 1/2000 |
| JP | 2000050595 A | 2/2000 |
| JP | 2001275310 A | 10/2001 |
| JP | 2003-204654 A | 7/2003 |
| JP | 2005098738 A | 4/2005 |
| JP | 2007094294 A | 4/2007 |
| JP | 2008220061 A | 9/2008 |
| JP | 2010172166 A | 8/2010 |
| JP | 2010273494 A | 12/2010 |
| JP | 2011048022 A | 3/2011 |

* cited by examiner

*Primary Examiner* — Dang Le
(74) *Attorney, Agent, or Firm* — Faegre Baker Daniels LLP

(57) ABSTRACT

A motor has a motor body and a control unit, which is joined to the motor body. A resolver is connected to the control unit through a flat cable. The flat cable is arranged such that the width direction of the flat cable corresponds with a circumferential direction of the motor body. The flat cable extends outwardly in a radial direction of the motor case.

10 Claims, 7 Drawing Sheets

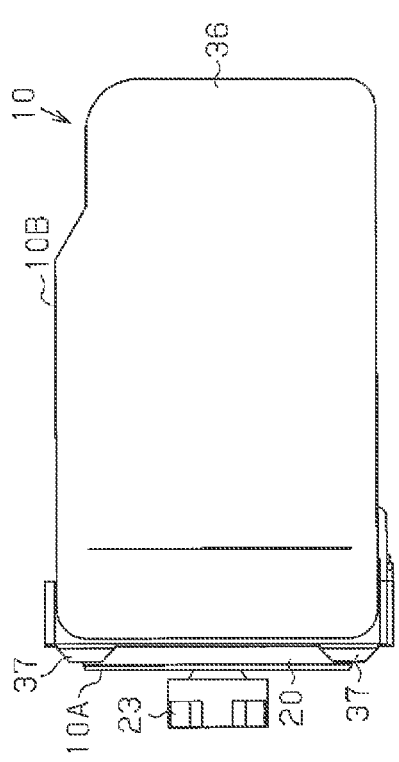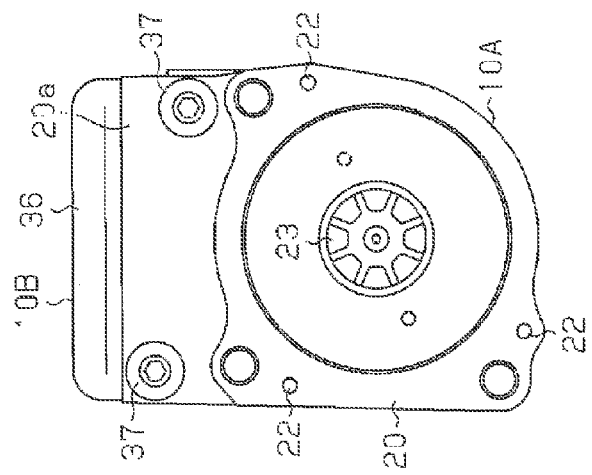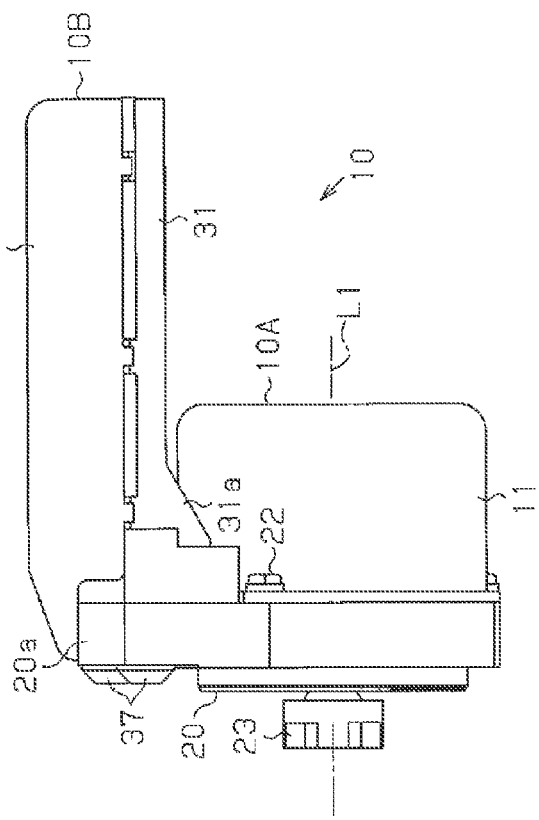

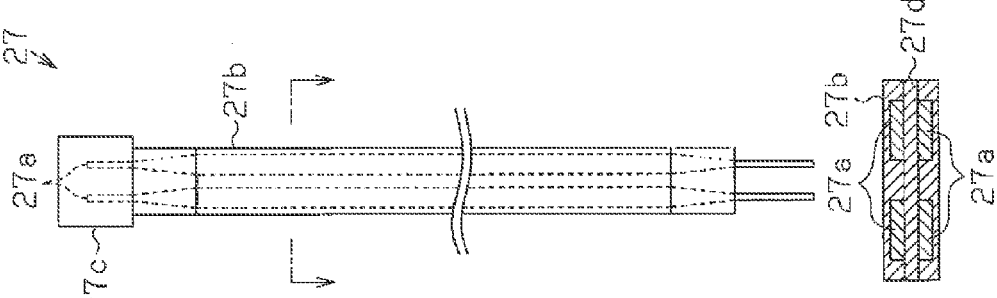
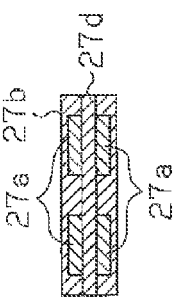
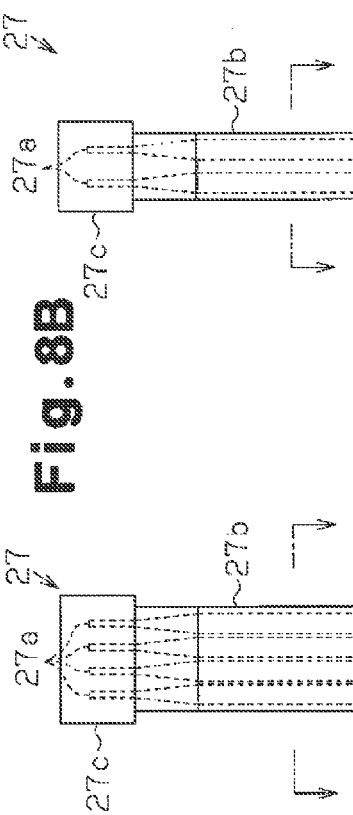
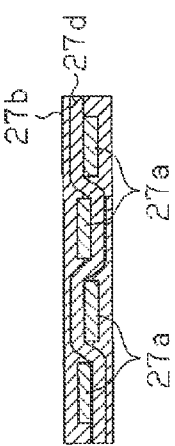
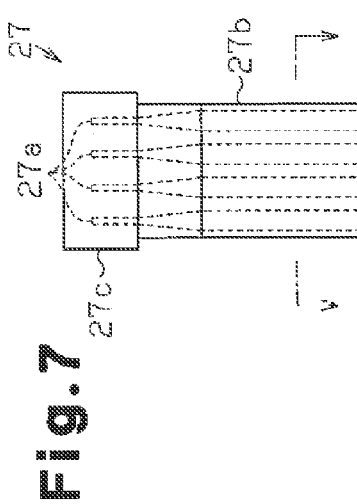
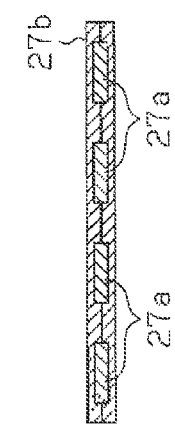

MOTOR AND MOTOR FOR ELECTRIC POWER STEERING

BACKGROUND OF THE INVENTION

The present invention relates a motor integrated with a control unit and a motor for an electric power steering.

Japanese Laid-Open Patent Publication No. 2003-204654 discloses an electric power steering having a motor. The electric power steering has a control unit attached to a side surface of a motor body. A drive control circuit in the control unit is electrically connected to the motor body. The motor body is a brushless motor having a resolver for detecting the rotational position of a rotor. The drive control circuit generates three phase drive current corresponding to the rotational position of the rotor based on a signal provided by the resolver. The drive current is supplied to drive coils of the corresponding phase, thus controlling rotation of the motor body.

In this motor, the resolver in the motor body and the drive control circuit in the control unit are connected to each other through a plurality of flexible lead wires. The lead wires are aligned in the axial direction of the motor body and extended out from the motor body to the control unit. This configuration increases the axial dimension of the portion of the motor body from which the lead wire is extended out, thus enlarging the motor as a whole. Additionally, it is complicated to connect each one of the lead wires, which are extended out from the motor body, to the control unit.

SUMMARY OF THE INVENTION

Accordingly, it is an objective of the present invention to provide a motor and a motor for an electric power steering that have a small axial dimension and facilitate cable connection.

To achieve the foregoing objective and in accordance with one aspect of the present invention, a motor having a motor body and a control unit joined to the motor body is provided. The control unit controls rotation of the motor body. A drive control circuit in the control unit is electrically connected to the motor body. The motor includes a sensor arranged in the motor body to detect the rotational position of a rotor. The sensor has a connection cable connected to the control unit. The connection cable is a flat cable including a plurality of conductor lines and an elongated coating material for coating the conductor lines. The conductor lines are arranged in a width direction of the coating material. The flat cable is flexible in a thickness direction of the flat cable. The flat cable is arranged such that a width direction of the flat cable corresponds with a circumferential direction of the motor body. One of opposite ends of the flat cable is connected to the sensor, the other end of the flat cable extends outwardly in a radial direction of the motor body.

In accordance with another aspect of the present invention, motor for an electric power steering employing the configuration of the above described motor is provided.

BRIEF DESCRIPTION OF THE DRAWINGS

FIG. 1A is a plan view showing a motor integrated with a control unit according to one embodiment of the present invention;

FIG. 1B is a side view showing the control unit-integrated motor;

FIG. 1C is a front view showing the control unit-integrated motor;

FIG. 7 is a plan view with a cross-sectional view showing a flat cable;

FIG. 8A is a plan view with a cross-sectional view showing a flat cable of a modification;

FIG. 8B is a plan view with a cross-sectional view showing a flat cable of another modification;

DETAILED DESCRIPTION OF THE PREFERRED EMBODIMENTS

Figure 2:
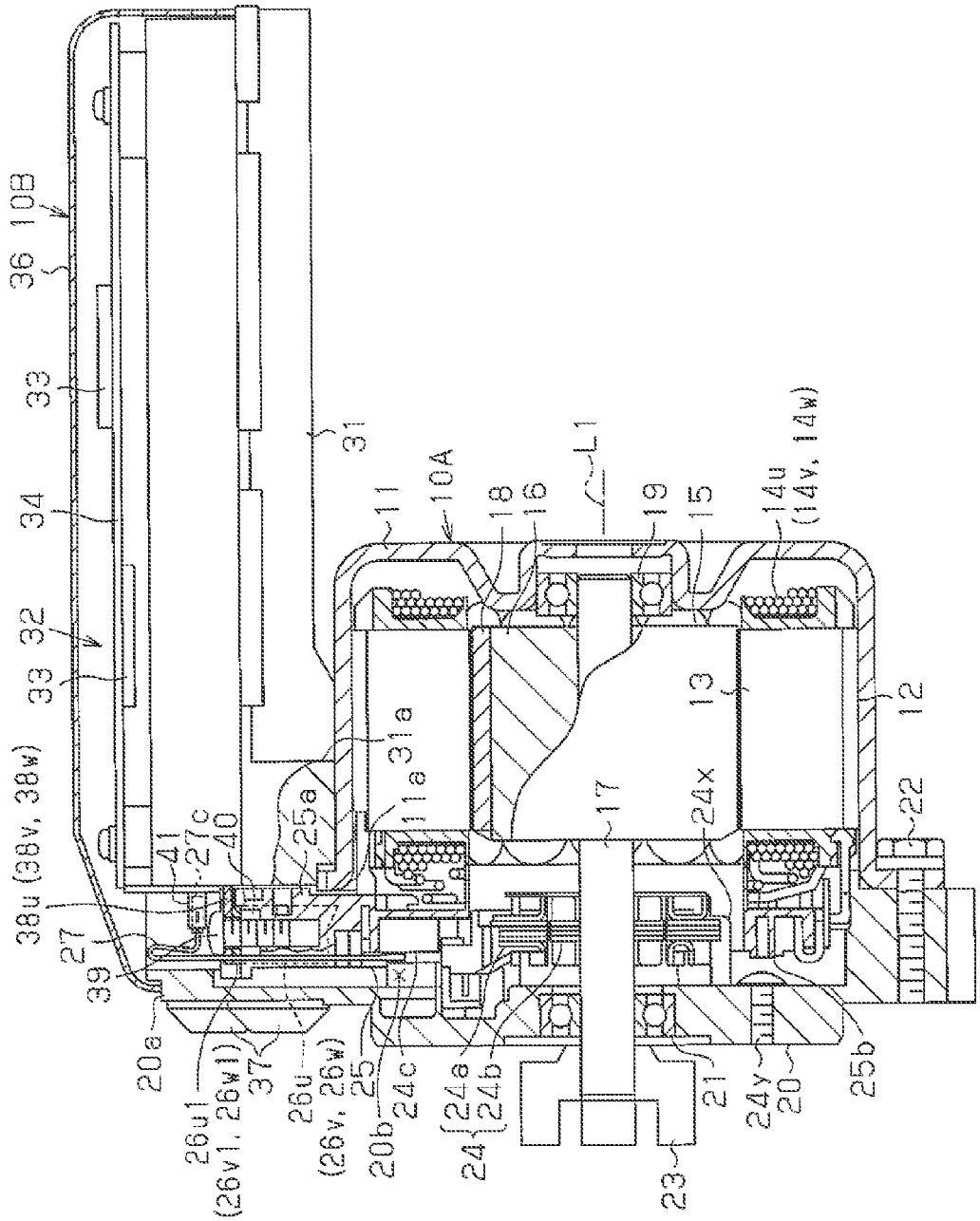
FIG. 2 is a cross-sectional view showing the control unit and a motor body.

One embodiment of a motor according to the present invention employed in an electric power steering (EPS) will now be described with reference to FIGS. 1A to 7.

As illustrated in FIGS. 1A to 1C and 2, a motor 10 has a motor body 10A and a control unit 10B, which is joined to the motor body 10A.

The motor body 10A is formed by a brushless motor. The motor body 10A has a motor case 11 having a lidded cylindrical shape. An annular stator 12 is fixed to the inner peripheral surface of the motor case 11. A rotor 15 is arranged in the stator 12. Drive coils 14u, 14v, 14w for three phases, which are U, V, and W phases, are mounted in a stator core 13 of the stator 12. When three phase electric current is supplied from a control unit 10B to the stator 12, the stator 12 produces a rotating magnetic field, thus rotating the rotor 15.

The rotor 15 has a rotor core 16, a rotary shaft 17, which is received in a central portion of the rotor core 16, and a magnet 18 fixed to the outer peripheral surface of the rotor core 16. The proximal end of the rotary shaft 17 is supported by the bottom of the motor case 11 through a bearing 19. The distal end of the rotary shaft 17 is supported by a central portion of an end frame 20, which closes an opening 11a formed in the motor case 11, through a bearing 21. The end frame 20 is attached to the wall around the opening 11a using a plurality of fixing screws 22. The distal end of the rotary shaft 17 projects outward from the end frame 20 and is connected to a steering mechanism (not shown) through a connection member 23.

Figure 5:
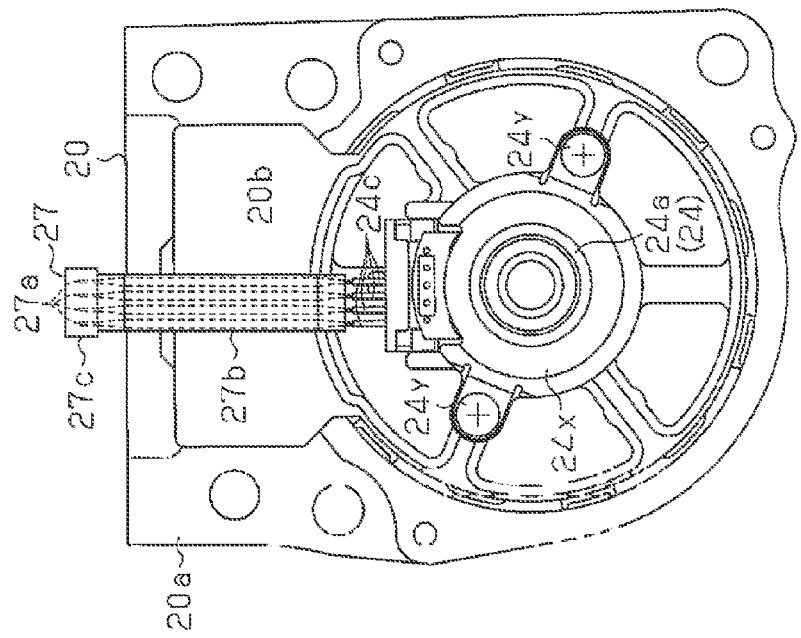
FIG. 5 is a rear view showing an end frame.

A resolver 24 is arranged in the vicinity of the opening 11a of the motor case 11 as a sensor for detecting the rotational position of the rotor 15. The resolver 24 has an annular resolver stator 24a and a resolver rotor 24b, which is arranged at the inner side of the resolver stator 24a. As shown in FIG. 5, the resolver stator 24a is fixed to the end frame 20 together with an attachment cover 24x, which covers the resolver stator 24a, by means of fixing screws 24y. With reference to FIG. 2, the resolver rotor 24b is fixed to the rotary shaft 17.

A drive control circuit 32 in the control unit 10B detects the rotational position of the rotor 15 based on a detection signal output from the resolver 24. In the present embodiment, an error caused in assembly of components including the resolver 24 is corrected at the time of detection of the rotational position by the drive control circuit 32. In other words, the error in assembly is electrically absorbed, thus making it unnecessary to perform position adjustment when the resolver stator 24a is mounted. In this case, such correction, which is performed at the time of detection of the rotational position, is carried out by memorizing the phase difference between an output waveform of the resolver 24 and an induced voltage waveform of the motor body 10A and canceling the phase difference.

Figure 6:
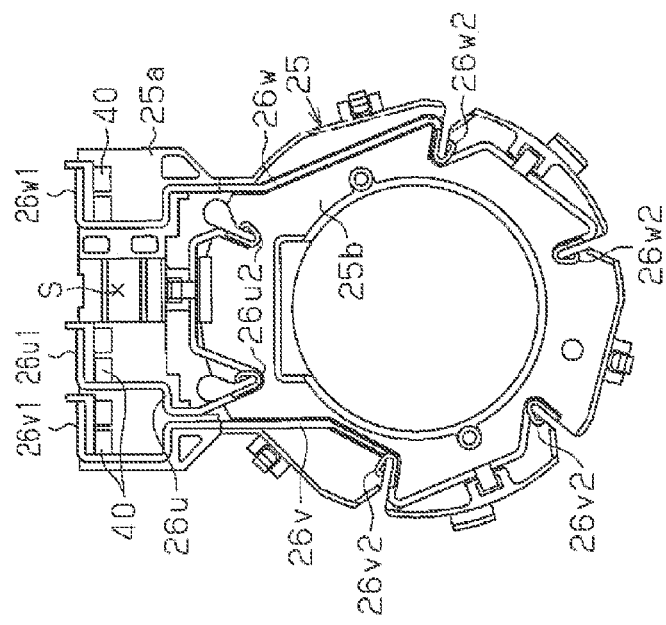
FIG. 6 is a front view showing a holder member as viewed from the side corresponding to the end frame.

A holder member 25, which is illustrated in FIG. 6, is arranged around the resolver 24 to support feeder terminals 26u, 26v, 26w of the three phases. The holder member 25 is attached to the stator 12. An electric current from the control unit 10B is supplied to the drive coil 14u, 14v, 14w of the corresponding phase through the feeder terminal 26u, 26v, 26w of the phase. With reference to FIGS. 2 and 6, the holder member 25 has a substantially annular ring 25b capable of receiving the resolver 24 and a projection 25a, which projects radially outward from a portion of the ring 25b. The projection 25a projects from between the opening 11a of the motor case 11 and the end frame 20 to the exterior. The feeder terminals 26u, 26v, 26w of the three phases are supported each by the holder member 25 in a manner straddling the ring 25b and the projection 25a.

The feeder terminal 26u, 26v, 26w of each phase is formed by bending a conductive metal plate having a substantially uniform width. The direction of the width of each feeder terminal 26u, 26v, 26w is parallel to the axis L1 of the motor body 10A. The feeder terminals 26u, 26v, and 26w of the three phases include wire connecting portions 26u2, 26v2, and 26w2, respectively. The wire connecting portions 26u2, 26v2, 26w2 are arranged at respective predetermined positions in the ring 25b. The feeder terminal 26u, 26v, 26w of each phase is connected to the terminal wire of the drive coil 14u, 14v, 14w of the phase.

Figure 3:
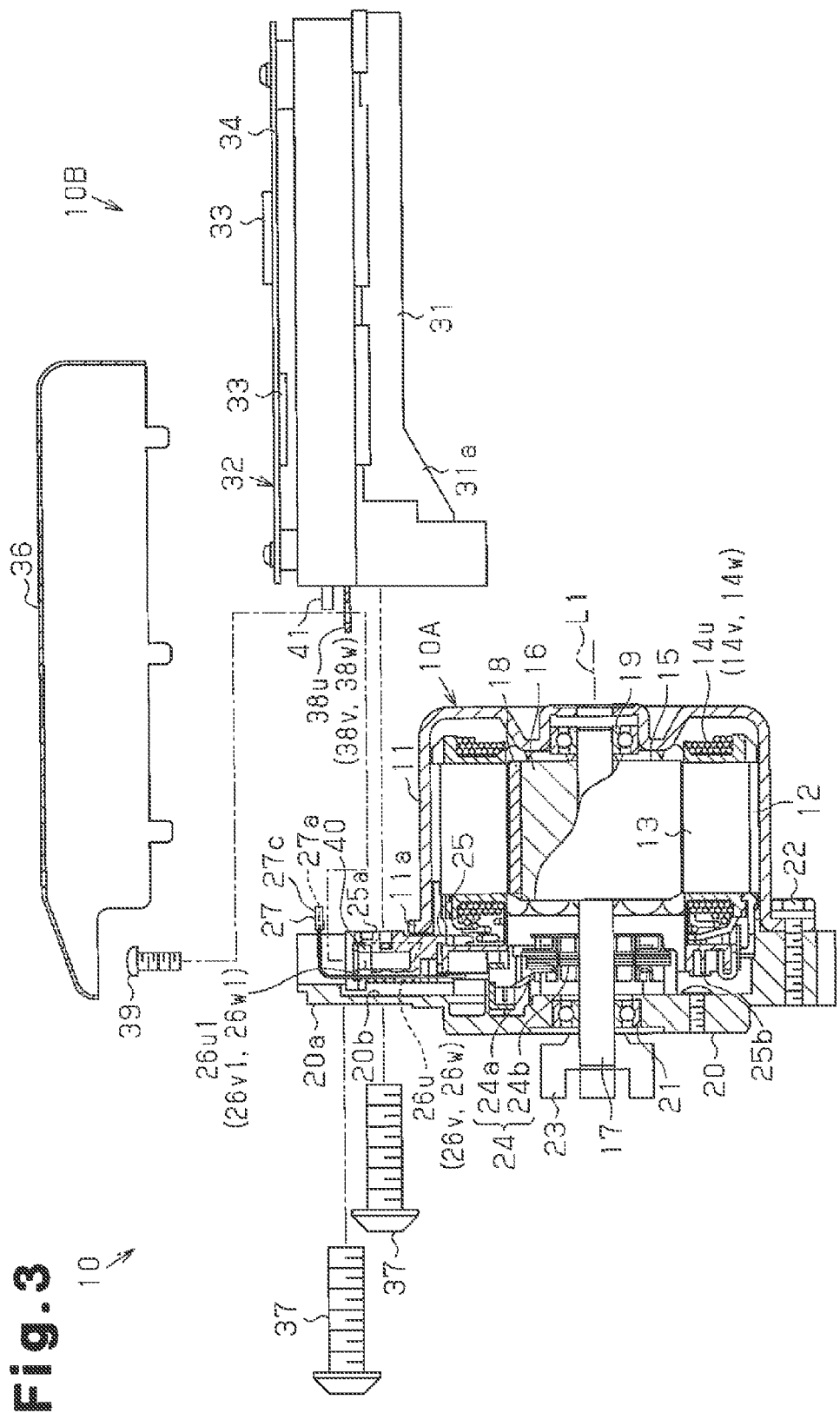
FIG. 3 is a cross-sectional view showing the control unit and the motor body before the control unit is attached to the motor body.
Figure 4:
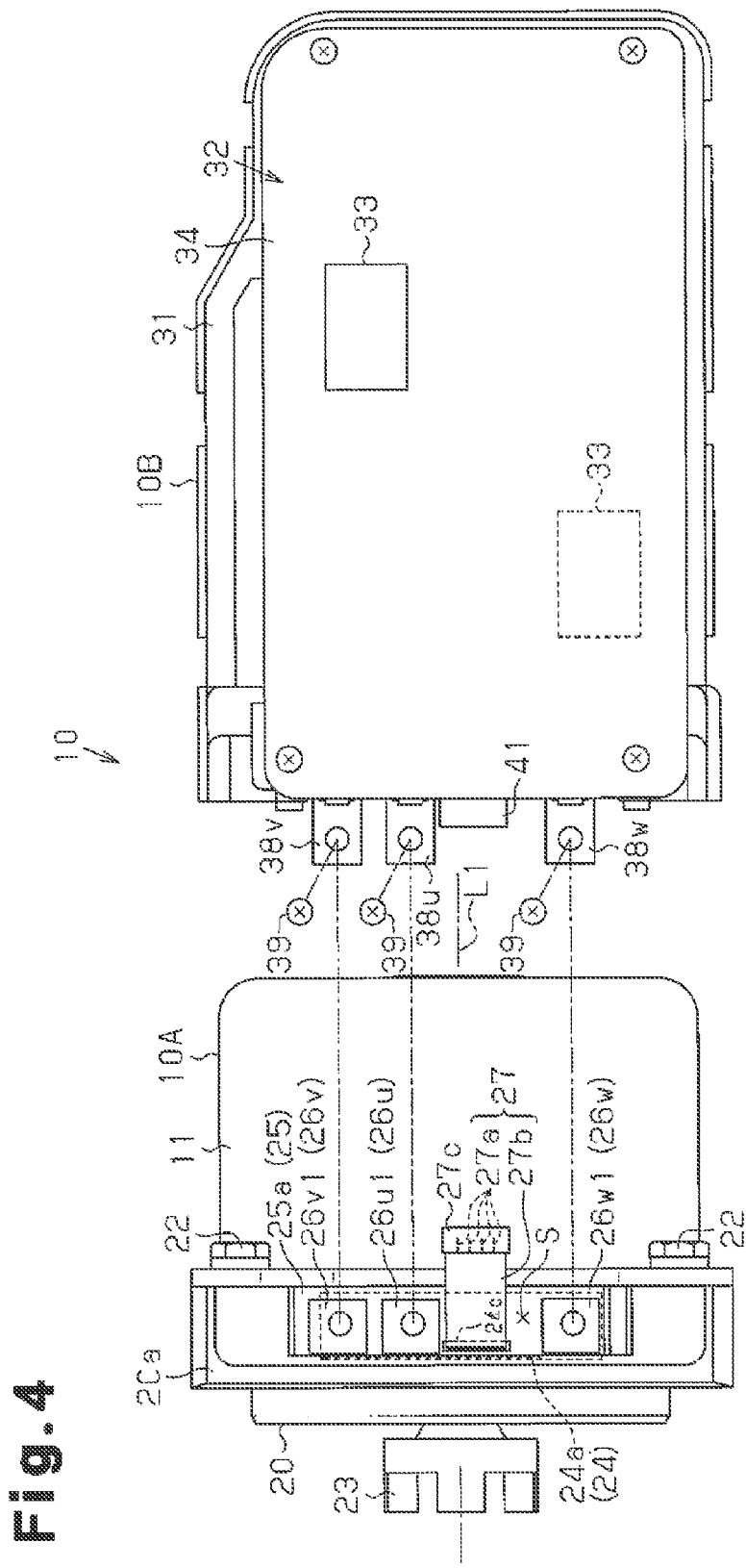
FIG. 4 is a plan view showing the control unit and the motor body before the control unit is attached to the motor body.

With reference to FIGS. 3 and 4, connecting ends 26u1, 26v1, 26w1 of the corresponding feeder terminals 26u, 26v, 26w of the three phases are exposed on the outer end surface of the projection 25a. Each of the connecting ends 26u1, 26v1, 26w1 is formed as a flat plate extending in a direction perpendicular to a radial direction of the motor body 10A, or, in other words, along the axis L1 of the motor body 10A. The connecting ends 26u1, 26v1, 26w1 of the three phases are aligned in a circumferential direction of the motor body 10A. In the present embodiment, the connecting end 26v1 of V phase, the connecting end 26u1 of U phase, and the connecting end 26w1 of W phase are arranged sequentially in this order. A clearance S is formed between the connecting end 26u1 of U phase and the connecting end 26w1 of W phase. An end of a flat cable 27, which is connected to the resolver stator 24a, is extended out to the exterior of the motor body 10A through the clearance S. The end of the flat cable 27 and the connecting ends 26u1, 26v1, 26w1 of the three phases are aligned in the circumferential direction.

The flat cable 27 is formed by coating four parallel conductor lines 27a using an elongated coating material 27b. The flat cable 27 is easy to bend in the thickness direction but hard in the width direction. As illustrated in FIG. 7, each of the conductor lines 27a is formed by a round wire. The portion of each conductor line 27a coated by the coating material 27b is formed flat by flattening the round wire in the direction of the thickness of the flat cable 27. This makes it easy for the flat cable 27 to flex in the thickness direction. The flat cable 27 is arranged such that the width direction of the flat cable 27 corresponds with the direction in which the connecting ends 26u1, 26v1, 26w1 are aligned.

With reference to FIG. 4, a sensor terminal 24c of the resolver stator 24a is arranged on the axis L1 of the motor body 10A. The flat cable 27 is extended straight out from the clearance S without bending in the width direction from the connecting portion with respect to the resolver stator 24a. This is brought about by structural characteristics of the flat cable 27 and decreases the length of the flat cable 27 as a whole. In other words, the positions of the connecting ends 26u1, 26v1, 26w1 and the position of the clearance S are set such that the flat cable 27 is extended out in the above-described manner. In the present embodiment, as has been described, since an error caused in assembly of components including the resolver 24 is electrically absorbed, it is unnecessary to provide a structure for adjusting the circumferential position of the resolver stator 24a. This allows use of the flat cable 27, which is difficult to bend in the circumferential direction.

As illustrated in FIGS. 1 to 4, the end frame 20 has an attachment portion 20a, which extends radially outward. The attachment portion 20a covers the surface of the projection 25a opposite to the motor case 11 and opposite side surfaces of the projections 25a. The end frame 20 has an accommodating recess 20b for accommodating the holder member 25. The accommodating recess 20b has an opening, which faces in the direction of the axis L1 of the motor body 10A. The attachment portion 20a has an opening, which faces in a radial direction of the motor body 10A. The distal surface of the projection 25a is exposed from the opening of the attachment portion 20a to expose the connecting ends 26u1, 26v1, 26w1. A base member 31, which is a component of the control unit 10B, is attached to the attachment portion 20a.

The base member 31 has a substantially rectangular shape extending along the axis L1 of the motor body 10A. The drive control circuit 32 for driving and controlling the motor body 10A is mounted in the base member 31. The drive control circuit 32 is formed by a circuit substrate 34 and various types of circuit components 33, which are connected to the circuit substrate 34. The drive control circuit 32 is connected to a steering ECU through a connector (not shown) formed on the circuit substrate 34. A cover member 36 is swaged onto the base member 31 to cover the drive control circuit 32.

An end surface of the base member 31 faces the attachment portion 20a of the end frame 20 and extends perpendicularly to the axis L1 of the motor body 10A. The end surface of the base member 31 is fastened to the attachment portion 20a of the end frame 20 in the direction of the axis L1 using two fixing screws 37. The fixing screws 37 are arranged near opposite side portions of the projections 25a of the holder member 25. A contact portion 31a is formed on a side surface of an end portion of the base member 31. When the base member 31 is fixed to the holder member 25, the contact portion 31a is held in contact with the outer peripheral surface of the motor case 11. However, the contact portion 31a does not necessarily have to contact the outer peripheral surface of the motor case 11.

As illustrated in FIG. 4, connecting terminals 38u, 38v, and 38w of U, V, and W phases project from the end surface of the base member 31 in a longitudinal direction of the base member 31. In other words, the connecting terminals 38u, 38v, 38w of the three phases project from the end surface of the base member 31 along the axis L1 of the motor body 10A. The connecting terminals 38u, 38v, 38w of the phases are aligned in correspondence with the connecting ends 26u1, 26v1, 26w1 of the corresponding feeder terminals 26u, 26v, 26w. The connecting terminals 38u, 38v, 38w are electrically connected to the circuit substrate 34 of the drive control circuit 32. As shown in FIG. 2, when the base member 31 is attached to the end frame 20, the connecting terminals 38u, 38v, 38w radially overlap with the connecting ends 26u1, 26v1, 26w1 of the feeder terminals 26u, 26v, 26w. The connecting terminal 38u, 38v, 38w of each phase and the corresponding connecting end 26u1, 26v1, 26w1 are connected to and radially pressed against each other using a fastening screw 39. The fastening screw 39 is threaded onto a nut 40 mounted in the projection 25a of the holder member 25. The end of the flat cable 27 extended out from the motor body 10A is formed as a connector 27c, which is engaged with a connector 41. The connector 41 is electrically connected to the circuit substrate 34 in the base member 31. This electrically connects the drive control circuit 32 to the drive coils 14u, 14v, 14w of the three phases through the corresponding feeder terminals 26u, 26v, 26w. The drive control circuit 32 is electrically connected also to the resolver stator 24a through the flat cable 27.

A procedure of joining the control unit 10B to the motor body 10A will hereafter be described with reference to FIGS. 3 and 4.

In advance, the motor body 10A is assembled and the drive control circuit 32 is mounted in the control unit 10B. The base member 31 is then attached to the attachment portion 20a of the end frame 20 in the direction of the axis L1 using the two fixing screws 37. This closes the accommodating recess 20b of the attachment portion 20a by means of the base member 31. With the base member 31 attached to the attachment portion 20a, the connecting terminals 38u, 38v, 38w of the three phases are located to overlap the connecting ends 26u1, 26v1, 26w1 of the feeder terminals 26u, 26v, 26w.

Subsequently, the connecting terminals 38u, 38v, 38w of the three phases are radially fastened to the corresponding connecting ends 26u1, 26v1, 26w1 using the three fastening screws 39. The connector 27c of the flat cable 27 is engaged with the connector 41, which is connected to the circuit substrate 34 of the drive control circuit 32. The order for performing fixation of the control unit 10B using the fixing screws 37, connection between the connecting terminals 38u, 38v, 38w and the corresponding connecting ends 26u1, 26v1, 26w1, and connection of the flat cable 27 may be modified as needed. The cover member 36 is then attached to the base member 31 to cover the drive control circuit 32. The radial opening of the attachment portion 20a is thus closed and the control unit 10B is joined to the motor body 10A. In this manner, the motor 10 for an EPS integrated with a control unit is completed.

In the drive control circuit 32, the circuit components 33 are operated to produce three phase drive current. The drive current is supplied from the connecting terminals 38u, 38v, 38w of the corresponding phases to the associated drive coils 14u, 14v, 14w in the stator 12 through the connecting ends 26u1, 26v1, 26w1 of the feeder terminals 26u, 26v, 26w. This causes the stator 12 to produce a rotating magnetic field, which rotates the rotor 15. The rotary shaft 17 thus rotates integrally with the rotor 15, and rotation of the rotary shaft 17 is transmitted to a steering mechanism through the connection member 23. In this manner, steering operation is assisted. Further, when the rotor 15 rotates, the resolver rotor 24b also rotates and the resolver stator 24a outputs a detection signal in correspondence with the rotational position of the rotor 15. The detection signal is provided to the drive control circuit 32 through the flat cable 27. The drive control circuit 32 acknowledges the rotational position of the rotor 15 based on the detection signal provided by the resolver stator 24a. Then, the drive control circuit 32 generates an appropriate drive current together with a command through the steering ECU, thus executing rotation control on the motor body 10A.

The present embodiment has the advantages described below.

(1) The flat cable 27 is employed as a connection cable for the resolver stator 24a. The flat cable 27 is arranged such that the width direction of the flat cable 27 corresponds with the circumferential direction of the motor body 10A. The flat cable 27 extends outwardly in the radial direction of the motor case 11 and is connected to the control unit 10B, which is joined to the motor body 10A. In this case, the flat cable 27 is arranged such that the direction of the thickness of the flat cable 27, which has a small dimension, corresponds with the direction of the axis L1 of the motor body 10A. This decreases the axial dimension of the motor body 10A. Particularly, when the resolver 24 includes a large number of connection cables, the axial dimension of the motor body 10A is decreased by arranging the flat cable 27 in the above-described manner. Also, the flat cable 27 is relatively inflexible in the width direction, in which the conductor lines 27a are aligned. That is, as a result of its flat shape, the cable 27 is relatively resistant to bending in the circumferential direction of the motor body 10A, as compared to the thickness direction, which is rotated ninety degrees from the thickness direction. The flat cable 27 is thus easily connected to the control unit 10B.

(2) The resolver 24 is electrically connected to the control unit 10B through the flat cable 27. As viewed in the axial direction of the motor body 10A, the flat cable 27 extends linearly outwardly in a radial direction. The flat cable 27 is thus straight, and the length of the flat cable 27 as a whole is minimized.

(3) The axial positions of the connecting ends 26u1, 26v1, 26w1 of the feeder terminals 26u, 26v, 26w of the three phases correspond to one another. The connecting ends 26u1, 26v1, 26w1 are aligned in the circumferential direction. The axial position of the flat cable 27, which is connected to the resolver 24, also corresponds to the axial positions of the connecting ends 26u1, 26v1, 26w1 of the phases. The flat cable 27 and the connecting ends 26u1, 26v1, 26w1 are aligned in the circumferential direction. This decreases the axial dimension of the portion of the connecting end 26u1, 26v1, 26w1 of each feeder terminal 26u, 26v, 26w and the axial dimension of the portion of the flat cable 27 extended out from the motor body 10A. As a result, the axial dimension of the motor body 10A is reduced.

(4) The end of the flat cable 27 is extended out from the clearance S, which is defined between two of the connecting ends 26u1, 26v1, 26w1 of the feeder terminals 26u, 26v, 26w of the three phases. The flat cable 27 is connected to the resolver 24, which is arranged in the central portion of the motor body 10A. The feeder terminals 26u, 26v, 26w of the three phases are connected to the corresponding drive coils 14u, 14v, 14w, which are aligned circumferentially. The feeder terminals 26u, 26v, 26w are arranged outward to the central portion of the motor body 10A. Accordingly, when the flat cable 27 is extended out through the clearance S, the feeder terminals 26u, 26v, 26w are prevented from crossing the flat cable 27 in the motor body 10A (see FIG. 6). Also, the flat cable 27 is extended out straight in the radial direction.

(5) Each of the feeder terminals 26u, 26v, 26w is formed by bending a conductive metal plate having a substantially uniform width. The width direction of each feeder terminal 26u, 26v, 26w is parallel to the axis L1 of the motor body 10A. In this case, the feeder terminals 26u, 26v, 26w are arranged such that the thickness direction of each feeder terminal 26u, 26v, 26w, which has a small dimension, corresponds with the circumferential direction of the motor body 10A. This decreases the radial dimension of the motor body 10A.

(6) The position of the resolver 24 in the direction of the axis L1 corresponds to the position of each feeder terminal 26u, 26v, 26w (the holder member 25) in the direction of the axis L1. This decreases the axial direction of the motor body 10A.

(7) The drive control circuit 32 includes a calculation section for correcting a detected rotational position of the rotor 15, thus electrically absorbing an error in assembly in the circumferential direction of the resolver 24. This makes it unnecessary to employ a mechanical structure for adjusting the circumferential position of the resolver 24, thus simplifying the configuration of the motor body 10A. Also, the flat cable 27, which is relatively resistant to bending in the width direction, is employed as a connection cable for the resolver 24. Further, the width direction of the flat cable 27 corresponds with the circumferential direction of the motor body 10A. As a result, the axial dimension of the motor body 10A is decreased.

(8) The flat cable 27 has the multiple conductor lines 27a, which are coated by the coating material 27b. The middle portion of each of the conductor lines 27a is flattened in the thickness direction of the conductor line 27a to form a flat shape. This decreases the dimension of the flat cable 27 in the thickness direction, thus reducing the axial dimension of the motor body 10A. Also, flexibility of the flat cable 27 in the thickness direction is improved.

(9) The control unit 10B is fixed to the motor body 10A in the direction of the axis L1 using the fixing screws 37. For example, if the flat cable 27 is connected to the control unit 10B before the control unit 10B is joined to the motor body 10A, the flat cable 27 is flexed in the direction in which the control unit 10B is joined to the motor body 10A. Also when the flat cable 27 is connected to the control unit 10B after the control unit 10B is joined to the motor body 10A, the flat cable 27 is flexed and connected to the control unit 10B. As a result, the control unit 10B is easily joined to the motor body 10A.

The above illustrated embodiment may be modified to the forms described below.

As illustrated in FIG. 8A, the flat cable 27 may be formed by a plurality of conductor lines 27a arranged at alternate positions in the thickness direction, an insulating film 27d extending along a surface of the flat cable 27 in a shape curved at each of the points between the adjacent pairs of the conductor lines 27a, and a coating material 27b for coating the conductor lines 27a and the insulating film 27d. This configuration decreases the interval between each adjacent pair of the conductor lines 27a, thus decreasing the dimension of the flat cable 27, compared to the flat cable 27 illustrated in FIG. 7. With reference to FIG. 8B, the flat cable 27 may be formed by an insulating film 27d extending along the surface of the flat cable 27, a plurality of conductor lines 27a arranged on both surfaces of the insulating film 27d to face each other, and a coating material 27b for coating the conductor lines 27a and the insulating film 27d. This configuration further reduces the dimension of the flat cable 27 in the width direction. As a result, the flat cables 27 illustrated in FIGS. 8A and 8B each save the space for installing the flat cable 27 in the motor body 10A, thus decreasing the radial dimension of the motor body 10A.

In the present embodiment, the middle portion of each of the conductor lines 27a, which are coated by the coating material 27b, does not necessarily have to be flat. Each conductor line 27a may be formed by a round wire as a whole.

Figure 9:
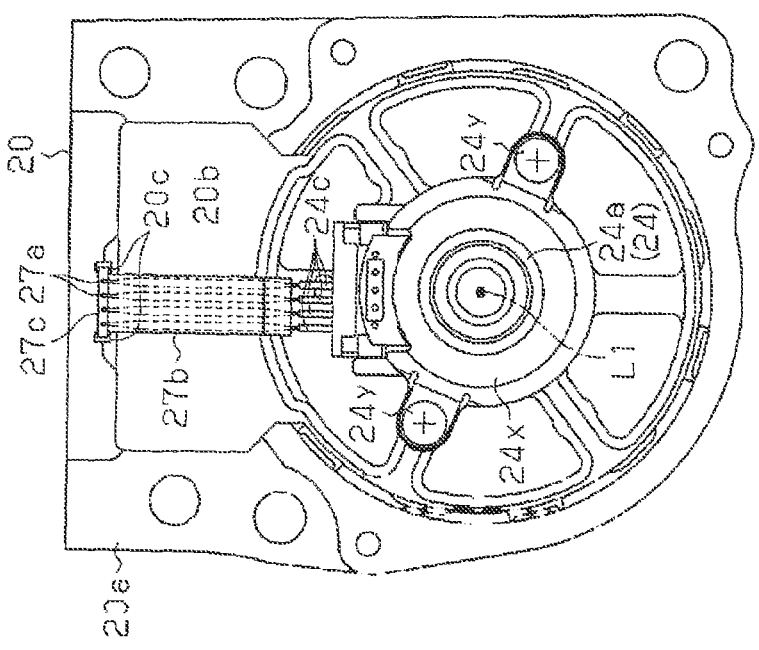
FIG. 9 is a rear view showing a flat cable of another modification in a state extended out from a resolver.

As illustrated in FIG. 9, a support portion 20c for supporting the connector 27c of the flat cable 27 may be formed in the end frame 20. Specifically, the support portion 20c may be formed such that the inserting direction of the connector 27c corresponds with the direction of the axis L1. This causes the connector 41 of the control unit 10B and the connector 27c of the flat cable 27 to be engaged with each other as soon as the control unit 10B is mounted in the attachment portion 20a of the end frame 20. In this case, it is unnecessary to perform a step of connecting the connector 27c to the connector 41. Further, the direction in which the connector 27c is received by the support portion 20c does not necessarily have to be the direction of the axis L1 but may be a radial direction.

Figure 10:
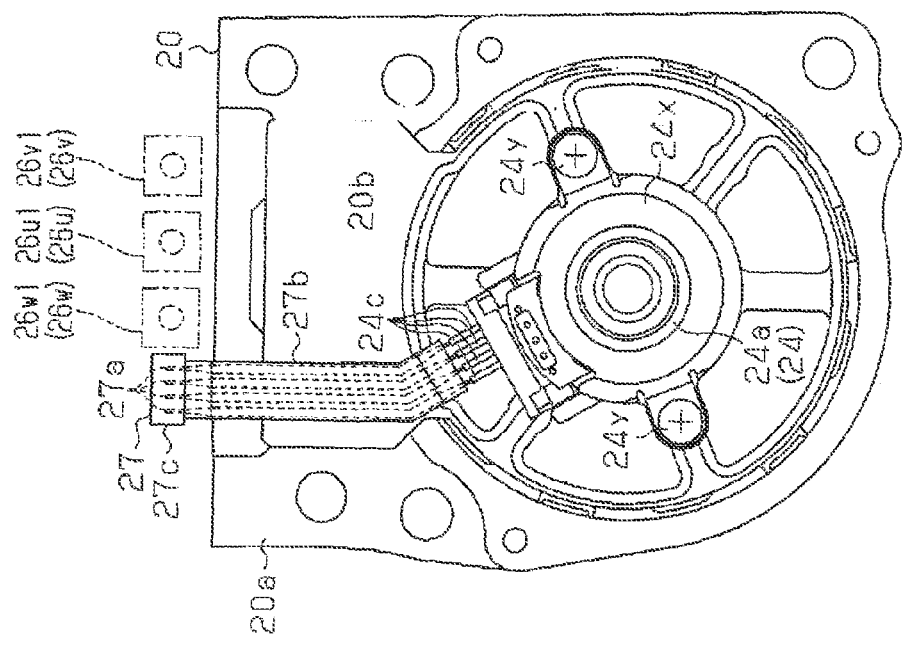
FIG. 10 is a rear view showing a flat cable of another modification in a state extended out from a resolver.

As illustrated in FIG. 10, the connecting ends $26u1$, $26v1$, $26w1$ may be arranged sequentially in the circumferential direction. The modification can be achieved, for example, by changing the positions of the sensor terminals 24c of the resolver stator 24a and bending the flat cable 27.

In the illustrated embodiment, the positional relationships of the connecting ends $26u1$, $26v1$, $26w1$ and the connecting terminals $38u$, $38v$, $38w$ in the overlapped state, the overlapping directions, the fastening directions of the fastening screws 39, and the positions of the nuts 40 may be changed.

In the illustrated embodiment, the order of the circumferential arrangement of the connecting ends $26u1$, $26v1$, $26w1$ of the feeder terminals $26u$, $26v$, $26w$ may be changed. In correspondence with the arrangement order of the connecting ends $26u1$, $26v1$, $26w1$, the arrangement order of the connecting terminals $38u$, $38v$, $38w$ of the control unit 10B must be changed.

In the illustrated embodiment, a cover member for covering the drive control circuit 32 and a cover member for covering the connecting portions of the connecting terminals $38u$, $38v$, $38w$ may be formed separately from each other.

In the illustrated embodiment, the control unit 10B is fixed to the motor body 10A along the axis L1 using the fixing screws 37. However, the control unit 10B may be fixed radially.

In the illustrated embodiment, the motor body 10A may be any suitable motor other than a brushless motor.

The present invention may be used in a motor employed for other purposes than an electric power steering (EPS).

We claim:

1. A motor having a motor body and a control unit joined to the motor body, the control unit controlling rotation of the motor body, a drive control circuit in the control unit being electrically connected to the motor body, wherein the motor includes a sensor arranged in the motor body to detect the rotational position of a rotor, the sensor has a connection cable connected to the control unit, the connection cable is a flat cable including a plurality of conductor lines and an elongated coating material for coating the conductor lines, the conductor lines are arranged in a width direction of the coating material, the flat cable is flexible in a thickness direction of the flat cable, the flat cable is arranged such that a width direction of the flat cable corresponds with a circumferential direction of the motor body, and one of opposite ends of the flat cable is connected to the sensor, the other end of the flat cable extends outwardly in a radial direction of the motor body, wherein the motor body includes a stator having drive coils of multiple phases, a cylindrical motor case for accommodating the stator, an end frame for closing an opening of the motor case, and connecting portions of feeder members of the phases for supplying electric current to the corresponding drive coils, the connecting portions of the feeder members of the phases are exposed radially from the motor case, the connecting portions of the feeder members of the phases and the flat cable are located at the same positions in the axial direction of the motor body, and aligned in the circumferential direction of the motor body, and the connecting portions of the feeder members of the phases extend from the motor case together with the flat cable, wherein a clearance is formed between each adjacent pair of the connecting portions of the feeder members of the phases, and the other end of the flat cable extends from the motor case through the clearance.

2. The motor according to claim 1, wherein, as viewed in the axial direction of the motor body, the flat cable extends linearly outwardly from an end connected to the sensor in the radial direction of the motor body.

3. The motor according to claim 1, wherein
the drive coils correspond to three phases,
the number of the feeder members corresponds to the number of the drive coils of the three phases, and
the clearance is set between the connecting portions of the feeder members of two phases and the connecting portion of the feeder member of one phase.

4. The motor according to claim 1, wherein
the feeder members are each formed by a plate material having a substantially uniform width, and
the feeder members are each arranged such that a width direction of the feeder member corresponds with the axial direction of the motor body.

5. The motor according to claim 1, wherein the sensor is arranged at a position overlapping the positions of the feeder members in the axial direction of the motor body.

6. The motor according to claim 1, wherein
the drive control circuit has an error correction section, and
the error correction section corrects a detected rotational position of the rotor to absorb an assembly error in a circumferential direction of the sensor.

7. The motor according to claim 1, wherein
the conductor lines each include a middle portion in a longitudinal direction of the conductor line, and
each of the middle portions is flat such that at least the dimension in a width direction is greater than the dimension in a thickness direction.

8. The motor according to claim 1, wherein the sensor is formed by a resolver.

9. The motor according to claim 1, wherein the control unit is fixed to the motor body in the axial direction of the motor body using a fastening member.

10. A motor for an electric power steering employing the configuration of the motor according to claim 1.

* * * * *